United States Patent [19]

Royer

[11] 4,145,728

[45] Mar. 20, 1979

[54] ROLLER BELT CONTROLS

[75] Inventor: Joel H. Royer, Indiana, Pa.

[73] Assignee: B&B Electrical Manufacturing Co. Inc., Seward, Pa.

[21] Appl. No.: 884,562

[22] Filed: Mar. 9, 1978

[51] Int. Cl.² ............................................. H02H 7/08
[52] U.S. Cl. ...................................... 361/23; 318/463
[58] Field of Search .................. 361/23; 318/312, 326, 318/327, 461, 463, 464

[56] References Cited

U.S. PATENT DOCUMENTS

| 3,365,614 | 1/1968 | Luongo et al. | 318/461 X |
| 3,845,375 | 10/1974 | Stiebel | 318/463 |
| 4,025,832 | 5/1977 | Jones | 318/463 X |

*Primary Examiner*—Harry E. Moose, Jr.
*Attorney, Agent, or Firm*—Alan S. Toppelberg; Daniel A. Curran

[57] ABSTRACT

Apparatus for detecting the RPM of any rotational material handling assembly such as those used in coal mining or textile manufacturing and including the electrical relay switches to shut down the assembly motors when an underspeed condition is sustained. A proximity switch detects the periodic presence of a metal target attached to the rotating member of the material handling assembly and generates digital pulses responsive to the belt speed. The pulses are supplied to a missing pulse detector which generates an output if the time it takes the rotating member to complete one revolution is longer than a preset adjustable reference time. The output, which indicates an underspeed condition, is used to de-energize a relay which is interlocked to the rotational material handling assembly drive motor thus shutting the motor down.

4 Claims, 1 Drawing Figure

U.S. Patent
Mar. 20, 1979
4,145,728
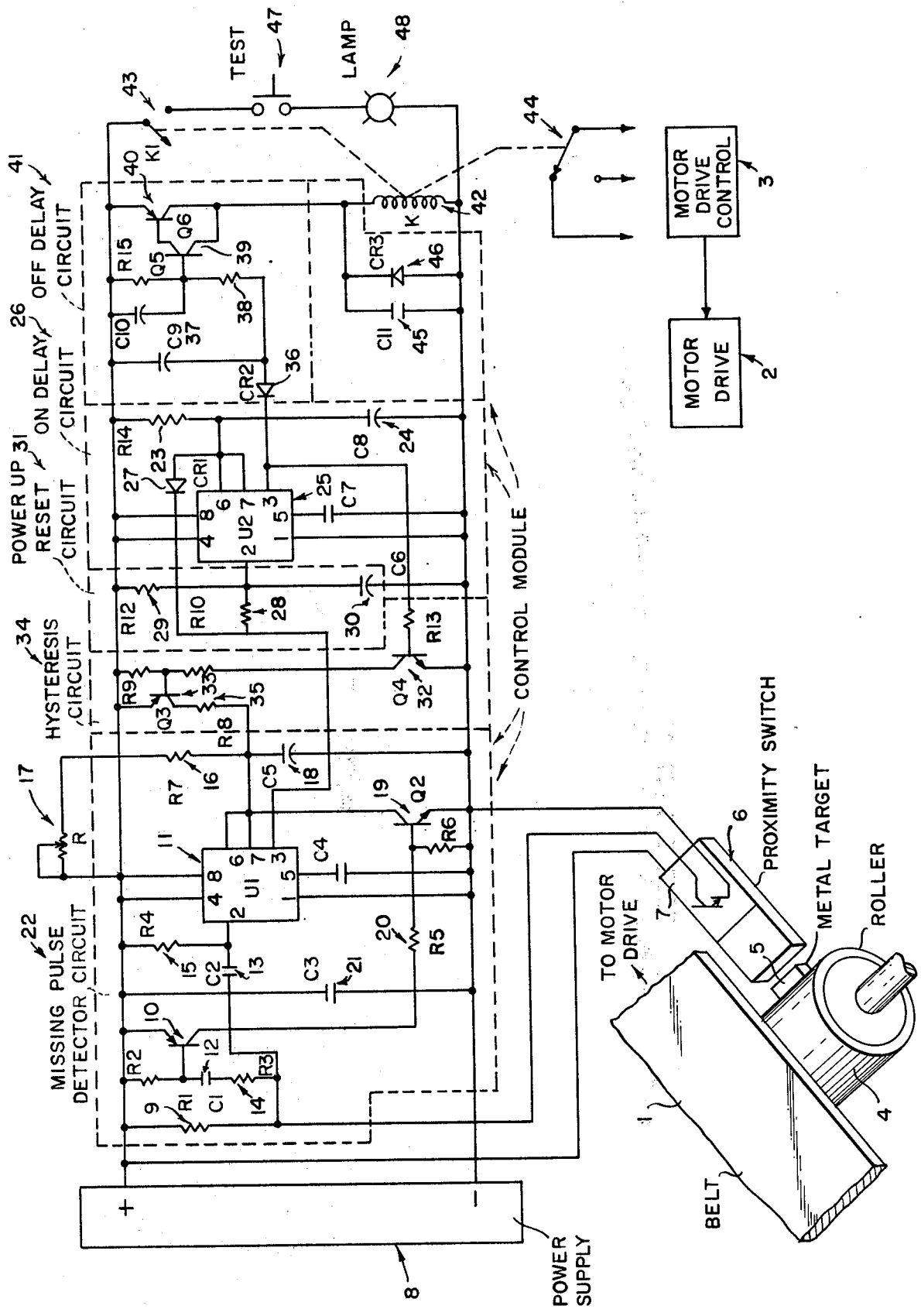

ROLLER BELT CONTROLS

SUMMARY OF THE INVENTION

1. Background of Prior Art

The invention pertains to speed-sensing devices for rotational material handling assemblies utilizing electronic signals to detect an underspeed condition such as belt breakage allowing a shutdown. Prior art attempts to solve the problems associated with using mechanical centrifugal switches to detect improper rotation of rotational material handling assemblies are illustrated by Stiebel, U.S. Pat. No. 3,845,375 and Jones, U.S. Pat. No. 4,025,832. Stiebel and Jones use analog voltage reference circuits while the invention uses a digital circuit which is useful in an electrically noisy environment. Jones uses magnets attached to the rotating member for providing the sensing signal, while Stiebel applies a light beam for the same purpose. This invention teaches that simple metal bar stock can be used with a proximity switch to generate the speed responsive signal.

The invention further teaches that the adjustable speed reference can have tolerance limits for momentary overspeed conditions as well as momentary underspeed conditions, thus avoiding nuisance operations of the motor circuits which are associated with fixed voltage reference analog circuits.

2. Brief Summary of the Invention

The invention provides an RPM sensing control circuit capable of protecting a rotational material handling assembly against underspeed conditions such as belt breakage or overload by providing an interlock to the drive motor for a safe shutdown. Another objective of the invention is to overcome the deficiencies of the prior art by providing a proximity switch with a digital output responsive to the belt speed for use in an electrically noisy environment. It is a further objective to provide a highly rugged, easily attached target for the proximity switch which will stand up to the punishment of a belt that might stray off of the roller. Also provided is a variable RPM set point based on a time principle which will allow the use of one or more targets and still provide rapid response at very low RPM's. The invention further provides a hysteresis function and on and off time verification circuits to prevent premature relay operation in the event of a surge or momentary underspeed condition.

The practice of the invention overcomes the disadvantages of the prior art by providing a metal target made from bar stock to be welded or otherwise attached to a roller responsive to belt speed. A proximity switch detects the periodic presence of the target and generates digital pulses responsive to belt speed. The pulses are supplied to a missing pulse detector which generates an output if the time that it takes the roller to complete one revolution is longer than a preset adjustable reference time, thus indicating an underspeed condition. This output is then used to de-energize a relay which is interlocked to the belt motor drive to de-energize the motor.

BRIEF DESCRIPTION OF THE DRAWING

The features of the invention will become clear from the detailed description which is intended only to represent one embodiment of the invention. The drawing and schematic represent the preferred embodiment.

DETAILED DESCRIPTION OF THE INVENTION

Referring to the FIGURE, a conveyor belt 1 is represented as being driven by an electric motor 2 and appropriate starter and control equipment 3. The belt 1 drives a supporting roller 4. A metal target 5 is welded or otherwise securely attached to the roller 4 or other rotating device being driven by the belt 1.

A proximity switch 6 is mounted in a location so the metal target 5 will enter its sensing field pattern with each revolution of the roller 4. The proximity switch 6 can be the well known high frequency oscillation type which induces eddy currents into the target 5. When the target 5 enters the field of the proximity switch 6, the oscillators cease and are sensed by an internal amplifier which turns on transistor Q 7. The transistor 7 is turned on once every revolution of the roller 4. It is apparent that if the repetition rate of output of the transistor 7 decreases, the belt 1 is traveling at a slower speed. The proximity switch 6 as well as all other components of the circuit are powered by the power supply 8.

The output of the transistor 7 is coupled to pull up resistor R1 9, located in the control module. With the transistor 7 it forms a digital square wave pulse responsive to the metal target 5. The square wave pulses are conducted to inverting amplifier Q1 10 and timing integrated circuit U1 11. Capacitors C1 12 and C2 13 limit the pulse width and will not pass a continuously low output from the transistor 7 as would be the case if the roller 4 and target 5 were to stop in the sensing pattern of the proximity switch 6. Resistor R3 14 limits the current to the base of the transistor 10. Resistor R4 15 is a pull up resistor. Resistor R7 16, adjustable resistor R 17, capacitor C5 18 and the integrated circuit 11 form a monostable timing circuit. The output of 11 goes low in a preset period of the time after it has been triggered. The adjustable resistor 17 permits the time period to be set to any desired value. The resistor 17 thus constitutes a variable reference time set point. The capacitor 13 triggers 11 at the repetition rate of the target 5.

The output of the transistor 10 drives transistor Q2 19 through current limiting resistor R5 20. The transistor 19 then discharges or resets capacitor C5 18 at the repetition rate of the target 5. Timer 11 and the transistor 19 thus comprise a missing pulse detector 22 giving a low output from the timer 11 if the capacitor 18 is not reset before it reaches its threshold, indicating that the target 5 is operating at a lower repetition rate than the period set by the resistor 17. The resistor 17 thus becomes a variable RPM set point setting a period inversely proportional to revolutions per minute of the roller 4. If the roller 4 period is faster than the period set by the resistor 17, capacitor 18 will always be reset before timer 11 times out and the output timer 11 will remain high, indicating an overspeed condition.

Timing resistor R14 23, capacitor C8 24 and integrated circuit U2 25 form a monostable on delay circuit 26 similar to timer 11 with its output going low in a preset period of time after it has been triggered. This acts as an overspeed verification circuit such that a continuous high output from the missing pulse detector 22, representing an overspeed condition, must exist for a preset period of time before a low output from the timer 25 is given. This eliminates false outputs from the timer 25 which could occur during a surge overspeed of the belt 1. Diode CR1 27 resets the capacitor 24 and will not let the timer 25 time out and go low during an underspeed condition.

Resistors R11 28 and R12 29 and capacitor C6 30 comprise a power up reset circuit 31. This eliminates false output signals from timer 25 which may occur during circuit start up.

Inverting amplifier transistors Q4 32 and Q3 33 form a hysteresis circuit 34 which shunts resistance R8 35 around the RPM set point resistor 17 in response to the output of the timer 25. This effectively changes its setting and provides a lower underspeed trip point than the overspeed trip point which elminiates nuisance operation at speeds near the set point.

Diode CR2 36, capacitor C9 37, resistor R16 38 and transistors Q5 39 and Q6 40 form an off delay timer 41 which is responsive to the output of timer 25. Base drive current from the capacitor 37 passes through the resistor 38 and transistors 39 and 40, keeping then in conduction for a set period of time after a high output from the timer 25. Diode 36 prevents the capacitor 37 from being discharged by the timer 25. The off delay timer 41 verifies that the underspeed condition exists for a preset period of time and is not momentary, thus avoiding nuisance operation.

Transistors 39 and 40 form a darlington pair to drive relay K 42, whose contacts are indicated by K1 43 and K2 44. Capacitor C11 45 and diode CR3 46 protect transistors 39 and 40 from high voltage produced by the coil of the relay 42 during rapid turn off.

Test button 47 and lamp 48 are provided to give a visual test of the condition of the relay 42.

Operation is as follows:

The proximity switch senses the presence of the metal target 5 attached to the roller 4 and produces a digital output for each revolution. This output is converted to narrow pulses by capacitors 12 and 13 and is used to trigger timer 11 and discharge the transistor 19, a missing pulse detector 22. During an overspeed condition, capacitor 18 is reset more rapidly than the period set by RPM set point resistor 17 and timer 11 cannot time out, thus maintaining a high output. This output allows the capacitor 24 to reach its threshold and the on delay verification timer 25 goes low after an overspeed condition of the preset period of time. The low output turns off the hysteresis circuit 34, setting the resistor 17 to a lower RPM setting. This low output also charges the capacitor 37 and turns on the transistors 39 and 40 which in turn energize the relay 42.

When the proximity switch 6 output rate falls below the lower rate of the RPM set point resistor 17, the transistor 19 does not reset the capacitor 18 before it reaches its threshold. The output of the missing pulse detector 22 goes low, triggers the timer 25 and resets the capacitor 24. The output of timer 25 goes high and turns on the hysteresis circuit 34 changing the RPM set point to a higher setting. The capacitor 37 discharges through the transistors 39 and 40. After a preset off delay verification time, if the output of the timer 25 is still high indicating a prolonged underspeed condition, the transistors 39 and 40 turn off and de-energize the relay 42. The contacts of the relay 42 transfer and interrupt the drive motor control 3 which in turn shuts off the drive motor 2 in response to the belt 1 underspeed.

The described embodiment does not limit the appended claims and it will be obvious to those skilled in the art that various modifications may be made which are encompassed by the claims.

I claim:

1. In a rotational material handling assembly, a digital RPM sensor and motor disconnecting system comprising:
    a. a means for detecting the RPM speed of a rotational material handling assembly and providing a digital pulse signal;
    b. means for amplifying and switching said pulse signal connected to said detector means and for providing said pulse amplified signal;
    c. means for detecting missing pulse signals receiving said amplified pulse signal to check the timing of said amplified pulse signal;
    d. time setting means connected to said missing pulse detector means providing the proper time setting corresponding to the allowable speed of said rotational material handling assembly;
    e. an on delay timer means connected to said missing pulse detector means to act as an overspeed verification so that the output from said missing pulse detector means, representing an overspeed condition, must exist for a preset period of time before an output from said on delay timer means is given;
    f. power up reset means connected to said on delay timer means which eliminates false output signals from said on delay timer means during startup;
    g. hysteresis circuit means connected to said time setting means and said on delay time means providing a lower said allowable speed setting during normal operations to prevent nuisance shutdown at speeds near the said allowable speed;
    h. off delay timer means connected to said on delay timer means which verifies that said lower speed condition exists for a preset period of time;
    i. relay means connected to said on and off delay timer means which activate when said proper speed setting is detected by said missing pulse detector means;
    j. relay protection means connected to said relay means to protect said off delay timer means from high voltage during rapid activation of said relay means;
    k. relay test and visual indication means connected to said relay means;
    l. switching means connected to said relay means to provide motor drive control to motor of said rotational material handling assembly.

2. A digital RPM sensor and motor disconnecting system as recited in claim 1 comprising:
    a. said RPM detection means connected to said rotational material handling means having at least one metal target means attached;
    b. said RPM detection means further comprises a proximity switch means which detects said metal target means when said target means enters the sensing field of said proximity switch means producing a pulse signal;
    c. said RPM detection means includes a pulse switching means which comprises a transistor means;
    d. said RPM detection means further comprises said relay means connected through said missing pulse detector means and on and off delay timer means to the said transistor means and;
    e. said relay means disconnects and connects said motor from said rotational material handling assembly.

3. Said RPM detection means as recited in claim 2 where a plurality of metal target means is attached for low RPM operations of said rotational material handling assembly.

4. Said RPM detection means as recited in claim 1 wherein:
   a. said missing pulse detector means comprises an inverting amplifier means, timing and integrated circuit means and variable resistor means forming a monostable timing circuit;
   b. said timing setting means comprises a variable resistor means;
   c. said on delay timer means comprises resistor means, capacitor means and an integrated circuit means forming a monostable on delay circuit;
   d. said power up reset means comprises a resistor means and capacitor means to form a power up reset circuit;
   e. said hysteresis circuit means comprises inverting transistor means which shunt resistance around said time setter means;
   f. said off delay timer means comprises diode means, capacitor means, resistor means and transistor means to form a timer circuit responsive to said on delay timer means;
   g. said relay means comprises a coil means and contact means activated by said on and off delay means.

* * * * *